US012304518B2

(12) United States Patent
Nakamura et al.

(10) Patent No.: US 12,304,518 B2
(45) Date of Patent: May 20, 2025

(54) VEHICLE

(71) Applicant: SUBARU CORPORATION, Tokyo (JP)

(72) Inventors: Ryota Nakamura, Tokyo (JP); Tsukasa Mikuni, Tokyo (JP); Takuya Homma, Tokyo (JP); Junichi Motoyama, Tokyo (JP); Kazuhiro Hayakawa, Tokyo (JP); Yuta Goto, Tokyo (JP); Takuya Kaneta, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 23 days.

(21) Appl. No.: 18/466,203

(22) Filed: Sep. 13, 2023

(65) Prior Publication Data

US 2024/0101140 A1 Mar. 28, 2024

(30) Foreign Application Priority Data

Sep. 27, 2022 (JP) ................. 2022-154266

(51) Int. Cl.
*B60W 50/14* (2020.01)
*B60W 40/08* (2012.01)
*B60W 50/00* (2006.01)

(52) U.S. Cl.
CPC ............ *B60W 50/14* (2013.01); *B60W 40/08* (2013.01); *B60W 2040/0818* (2013.01); *B60W 2050/0083* (2013.01); *B60W 2050/143* (2013.01); *B60W 2050/146* (2013.01); *B60W 2540/229* (2020.02)

(58) Field of Classification Search
CPC ................. B60W 50/14; B60W 40/08; B60W 2040/0818; B60W 2050/0083; B60W 2050/143; B60W 2050/146; B60W 2540/229

See application file for complete search history.

(56) References Cited

U.S. PATENT DOCUMENTS

| 11,420,636 B2 * | 8/2022 | Oba ...................... B60W 40/08 |
| 2009/0292528 A1 | 11/2009 | Kameyama |
| 2012/0212353 A1 * | 8/2012 | Fung ...................... G08G 1/167 |
| | | 701/1 |
| 2014/0167968 A1 * | 6/2014 | Tuzsuzov ............. B60K 28/066 |
| | | 340/576 |
| 2018/0297603 A1 * | 10/2018 | Jun ........................ G08G 1/167 |
| 2019/0108548 A1 * | 4/2019 | Gaither .............. G06Q 30/0272 |
| 2021/0323558 A1 * | 10/2021 | Nakanishi .......... G01C 21/3679 |
| 2022/0011132 A1 * | 1/2022 | Jia .......................... G06N 20/00 |

FOREIGN PATENT DOCUMENTS

JP 2009-282704 A 12/2009

* cited by examiner

*Primary Examiner* — Mohamed Barakat
(74) *Attorney, Agent, or Firm* — Rimon P.C.

(57) ABSTRACT

A vehicle includes a fatigue state detector, an information provider, and a processor. The fatigue state detector is configured to detect a fatigue degree of an occupant of the vehicle. The information provider is configured to provide various pieces of information related to traveling of the vehicle to the occupant. The processor is configured to change a frequency of providing the various pieces of the information by the information provider, depending on the fatigue degree of the occupant.

11 Claims, 5 Drawing Sheets

| INFORMATION ACQUIRED BY FATIGUE STATE DETECTOR 120 | DETECT FATIGUE STATE BEFORE GETTING IN VEHICLE MOBILE TERMINAL 10 OR WEARABLE TERMINAL | DETECT FATIGUE STATE DURING TRAVELING INFORMATION ACQUISITION DEVICE 110 OR CAMERA |
|---|---|---|
| HEART RATE | ACQUIRABLE | ACQUIRABLE |
| BLOOD OXYGEN SATURATION LEVEL | ACQUIRABLE | |
| HEART RATE VARIABILITY | ACQUIRABLE | ACQUIRABLE |
| RESPIRATION RATE | ACQUIRABLE | |
| BODY TEMPERATURE | ACQUIRABLE | |
| BLOOD PRESSURE | ACQUIRABLE | |
| SWEAT AMOUNT | ACQUIRABLE | |
| ACTIVITY AMOUNT | ACQUIRABLE | |
| SLEEP TIME | ACQUIRABLE | |
| REST TIME | ACQUIRABLE | |
| NUMBER OF TIMES OF BLINKING | | ACQUIRABLE |
| DEGREE OF EYE OPENING | | ACQUIRABLE |
| FACIAL EXPRESSION | | ACQUIRABLE |

FIG. 2

VEHICLE

CROSS-REFERENCE TO RELATED APPLICATIONS

The present application claims priority from Japanese Patent Application No. 2022-154266 filed on Sep. 27, 2022, the entire contents of which are hereby incorporated by reference.

BACKGROUND

The disclosure relates to a vehicle.

In recent years, a vehicle with a concierge function has been practically used that provides various pieces of information that seem to be beneficial to a driver or a passenger who has started to move.

For example, proposed as such a concierge function is a technique of providing information such as a recommended place, based on a keyword, etc. extracted from an occupant's conversation. For example, reference is made to Japanese Unexamined Patent Application Publication (JP-A) No. 2009-282704.

SUMMARY

An aspect of the disclosure provides a vehicle including a fatigue state detector, an information provider, and a processor. The fatigue state detector is configured to detect a fatigue degree of an occupant of the vehicle. The information provider is configured to provide various pieces of information related to traveling of the vehicle to the occupant. The processor is configured to change a frequency of providing the various pieces of the information by the information provider, depending on the fatigue degree of the occupant.

An aspect of the disclosure provides a vehicle including circuitry. The circuitry is configured to detect a fatigue degree of an occupant of the vehicle. The circuitry is configured to provide various pieces of information related to traveling of the vehicle to the occupant. The circuitry is configured to change a frequency of providing the various pieces of the information, depending on the fatigue degree of the occupant.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 2 is a diagram illustrating an example of information acquired by a fatigue state detector of the vehicle according to one example embodiment of the disclosure.

DETAILED DESCRIPTION

Figure 1:
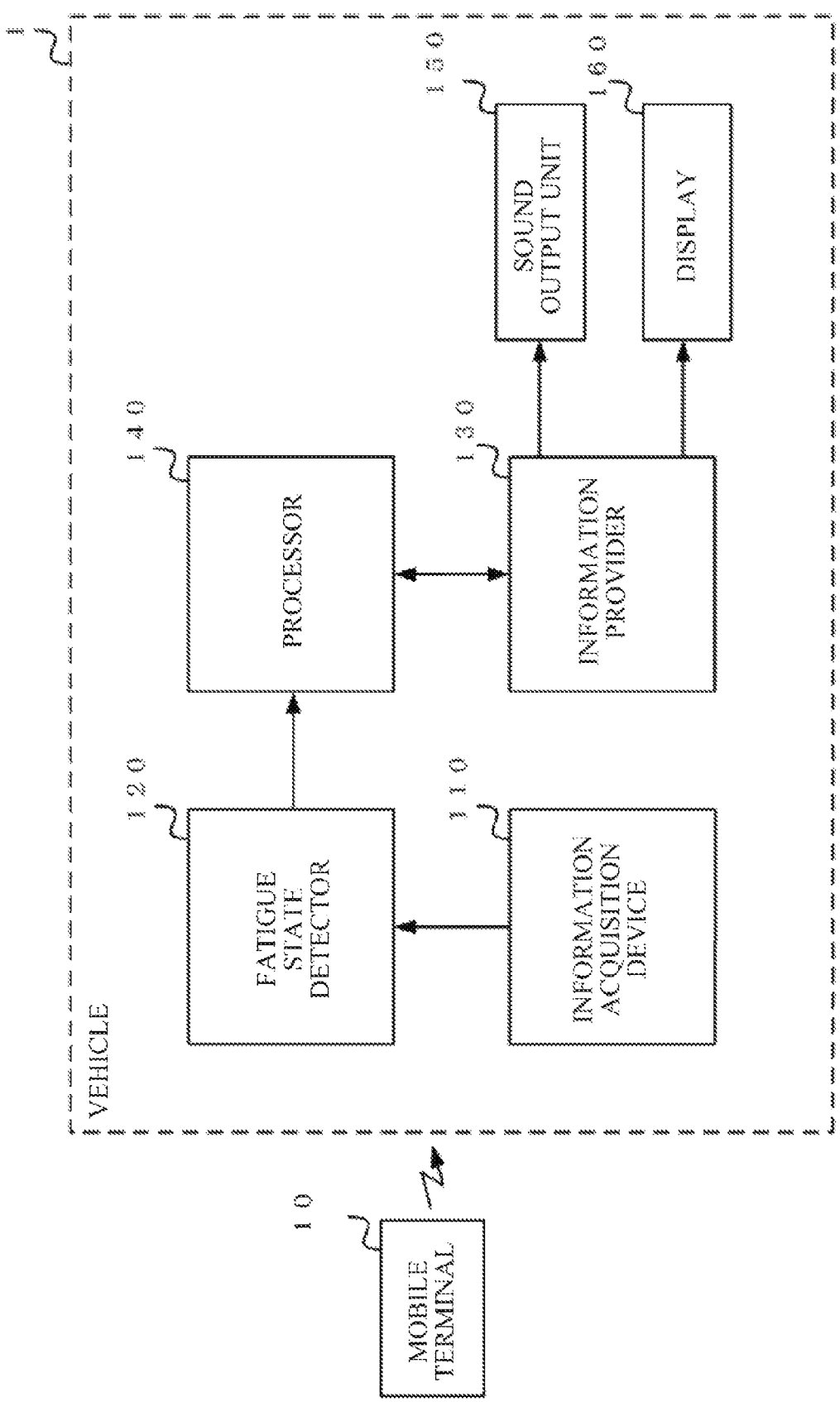
FIG. 1 is a diagram illustrating a configuration of a vehicle according to one example embodiment of the disclosure.

A technique disclosed in JP-A No. 2009-282704 performs information provision regardless of a fatigue degree of a driver, and the driver can thus feel uncomfortable about the information provision, depending on the fatigue degree of the driver.

It is desirable to provide a vehicle that makes it possible to perform information provision at a frequency considering a fatigue degree of an occupant of the vehicle.

In the following, some example embodiments of the disclosure are described in detail with reference to FIGS. 1 to 5. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

Figure 3:
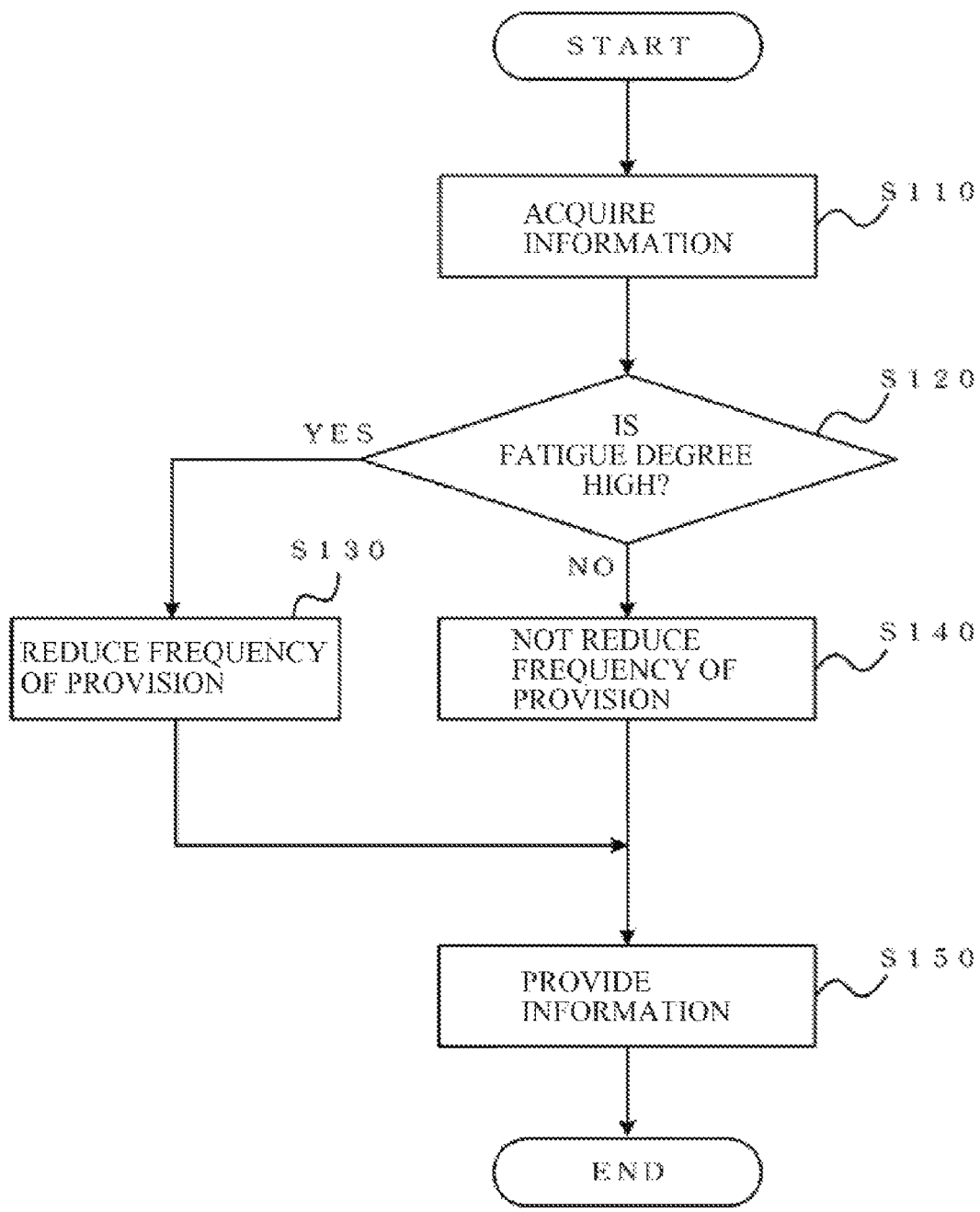
FIG. 3 is a diagram illustrating a processing flow of the vehicle according to one example embodiment of the disclosure.

A vehicle 1 according to a first example embodiment is described with reference to FIGS. 1 to 3. The vehicle 1 may also be referred to as an own vehicle.

Configuration of Vehicle 1

As illustrated in FIG. 1, the vehicle 1 according to the example embodiment may include an information acquisition device 110, a fatigue state detector 120, an information provider 130, a processor 140, a sound output unit 150, and a display 160.

The information acquisition device 110 acquires information related to a fatigue degree of an occupant.

In one example, the information acquisition device 110 may be a camera provided in a vehicle compartment of the vehicle 1, and may transmit captured image information of the occupant's face, body, etc. to the fatigue state detector 120 to be described later.

The information acquisition device 110 may be a dedicated camera. In another example, when the vehicle 1 includes a driver monitoring system (DMS), the information acquisition device 110 may transmit image information of the occupant captured by the DMS to the fatigue state detector 120.

The fatigue state detector 120 detects the fatigue degree of the occupant.

The fatigue state detector 120 may detect the fatigue degree of the occupant before getting in the vehicle or during traveling, based on information from a mobile terminal 10 of the occupant or the information acquisition device 110.

In one example, to detect the fatigue degree of the occupant before getting in the vehicle, the fatigue state detector 120 may acquire activity information and biometric information of the occupant before getting in the vehicle, for example, from the mobile terminal 10 carried by the occupant, and detect the fatigue degree of the occupant based on the information. The mobile terminal 10 may be a wearable terminal.

To detect the fatigue degree of the occupant during traveling, the fatigue state detector 120 may, for example, detect the fatigue degree of the occupant based on the captured image information of the occupant's face, body, etc. acquired from the information acquisition device 110. The information acquisition device 110 may be a camera.

As illustrated in FIG. 2, examples of the information obtained from the mobile terminal 10, e.g., a wearable terminal, may include a heart rate, a blood oxygen saturation level, heart rate variability, a respiration rate, a body temperature, a blood pressure, a sweat amount, an activity amount, a sleep time, and a rest time.

Examples of the information obtained from the information acquisition device 110, e.g., a camera, may include a heart rate, heart rate variability, the number of times of blinking, a degree of eye opening, and a facial expression.

The fatigue state detector 120 may determine whether the fatigue degree of the occupant is high, based on the information described above, and transmit a result of the determination to the processor 140.

An example of a method of detecting the fatigue degree of the occupant may be as follows. The fatigue state detector 120 may detect the fatigue degree of the occupant, by performing evaluation on a 1-to-5 scale for each piece of the acquired information, and comparing an average of the evaluation scores with a predetermined threshold.

The fatigue state detector 120 may, for example, detect that the fatigue degree of the occupant is low when the average of the evaluation scores is less than 3.5, and detect that the fatigue degree of the occupant is high when the average is 3.5 to 5.

Note that the method of detecting the fatigue degree is not limited to the method described above, as long as the fatigue state detector 120 is able to detect the fatigue degree of the occupant based on the information from the mobile terminal 10 of the occupant or the information acquisition device 110.

When detecting the fatigue degree of the occupant during traveling, the fatigue state detector 120 may detect the fatigue degree of the occupant based on both the information from the mobile terminal 10 and the information from the information acquisition device 110.

The information provider 130 provides various pieces of information related to traveling to the occupant.

In one example, the information provider 130 may provide, to the occupant, information beneficial for the occupant generated by an unillustrated information generator.

Examples of the various pieces of information related to traveling to be provided to the occupant may include information based on destination information set for a navigation device provided in the vehicle 1. The information based on the destination information may be, for example, information on a recommended tourist spot or shop around the destination and around a guidance route, weather information around the destination, traffic congestion information on the guidance route, and information related to traveling safety.

A frequency at which the information provider 130 provides information to the occupant may be controlled by an instruction from the processor 140 to be described later.

In other words, upon receiving information to be provided to the occupant from the unillustrated information generator, whether to provide the information to the occupant may be determined by the instruction from the processor 140.

The information provider 130 may provide information to the occupant via the sound output unit 150 and the display 160 to be described later.

The processor 140 may control an overall operation of the vehicle 1 in accordance with a control program stored in, for example, an unillustrated read only memory (ROM).

The processor 140 changes, depending on the fatigue degree of the occupant, the frequency of providing information by the information provider 130.

For example, the processor 140 may determine the frequency of providing information by the information provider 130, based on the fatigue degree of the occupant received from the fatigue state detector 120, and control the information provider 130 to achieve the frequency of provision.

In one example, when it is detected by the fatigue state detector 120 that the fatigue degree of the occupant is high, the processor 140 may perform control of reducing the frequency of providing information to the occupant. When it is detected that the fatigue degree of the occupant is low, the processor 140 may perform control of not reducing the frequency of providing information to the occupant.

In other words, when the frequency of information provision becomes high in a state in which the fatigue degree of the occupant is high, the occupant can feel uncomfortable. Accordingly, the processor 140 may perform control of reducing the frequency of providing information to the occupant from the information provider 130.

In contrast, in a state in which the fatigue degree of the occupant is not high, the processor 140 may perform control of providing all of the information generated by the information generator to the occupant, without reducing the frequency of providing information from the information provider 130.

Examples of a control method of changing, e.g., reducing, the frequency of information provision may include a method of restricting the number of pieces of information to be provided per unit time.

In one example, the processor 140 may restrict execution of information provision from the information provider 130, to prevent the frequency of information provision from becoming a frequency of once or more every 10 minutes.

Note that the control method of reducing the frequency of information provision is not limited to the method described above, and may be, for example, a method such as thinning-out information to be provided or deleting similar information. The thinning-out of information may be, for example, providing information reduced by 50%.

The sound output unit 150 may be, for example, a speaker. The sound output unit 150 may output audio information received from the information provider 130 to provide information to the occupant.

The display 160 may be, for example, a liquid crystal panel. The sound output unit 150 may display image information received from the information provider 130 to provide information to the occupant.

Processing by Vehicle 1

Processing performed by the vehicle 1 when providing information to the occupant is described with reference to FIG. 3.

The fatigue state detector 120 may acquire, from the mobile terminal 10 or the information acquisition device 110, information to be used to detect the fatigue degree of the occupant (step S110).

The fatigue state detector 120 may determine whether the fatigue degree of the occupant is high, based on the information acquired in step S110 (step S120).

If the fatigue state detector 120 determines that the fatigue degree of the occupant is high ("YES" in step S120), the fatigue state detector 120 may cause the processing to proceed to step S130.

If the fatigue state detector 120 determines that the fatigue degree of the occupant is not high ("NO" in step S120), the fatigue state detector 120 may cause the processing to proceed to step S140.

If it is determined by the fatigue state detector 120 that the fatigue degree of the occupant is high ("YES" in step S120), the processor 140 may perform control of reducing the frequency at which the information provider 130 provides information to the occupant (step S130), and cause the processing to proceed to step S150.

If it is determined by the fatigue state detector 120 that the fatigue degree of the occupant is not high ("NO" in step S120), the processor 140 may perform control of not reducing the frequency at which the information provider 130 provides information to the occupant (step S140), and cause the processing to proceed to step S150.

The information provider 130 may provide information to the occupant, in accordance with the control of the frequency of provision by the processor 140 (step S150), and end the processing.

Workings and Effects

As described above, the processor 140 of the vehicle 1 according to the example embodiment changes the frequency of providing information from the information provider 130, depending on the fatigue degree of the occupant detected by the fatigue state detector 120.

For example, when the frequency of information provision becomes high in a state in which the fatigue degree of the occupant is high, the occupant can feel uncomfortable about the information provision. Accordingly, the processor 140 may perform control of reducing the frequency of providing information to the occupant.

Thus, the vehicle 1 performs information provision at a frequency considering the fatigue degree of the occupant, which allows the occupant to perform driving without feeling uncomfortable.

The fatigue state detector 120 may detect the fatigue degree of the occupant before getting in the vehicle or during traveling of the vehicle, based on information from the mobile terminal 10 of the occupant or the information acquisition device 110.

For example, when the occupant gets in the vehicle, the fatigue state detector 120 may acquire information such as activity information or biometric information of the occupant up to immediately before getting in the vehicle, and detect the fatigue degree of the occupant based on the information.

Thus, the vehicle 1 detects the current fatigue degree of the occupant before the occupant starts driving, which makes it possible to perform information provision at the frequency considering the fatigue degree of the occupant from immediately after the start of driving.

Because the vehicle 1 performs information provision at the frequency considering the fatigue degree of the occupant of the vehicle, the occupant is able to perform driving without feeling uncomfortable.

In addition, the fatigue state detector 120 may detect the fatigue degree of the occupant during traveling, based on an image from the information acquisition device 110, e.g., a camera.

Thus, the vehicle 1 detects the fatigue degree of the occupant during traveling, which makes it possible to detect that the fatigue degree of the occupant has become high as a result of, for example, driving for a long time.

As a result, the vehicle 1 constantly performs information provision at the frequency considering the fatigue degree of the occupant, which allows the occupant to perform driving without feeling uncomfortable.

Second Example Embodiment

A vehicle 1A according to a second example embodiment is described with reference to FIGS. 4 and 5.

Note that components denoted with the same reference numerals as in the first example embodiment are configured to perform similar operations, and detailed description thereof is thus omitted.

Configuration of Vehicle 1A

Figure 4:
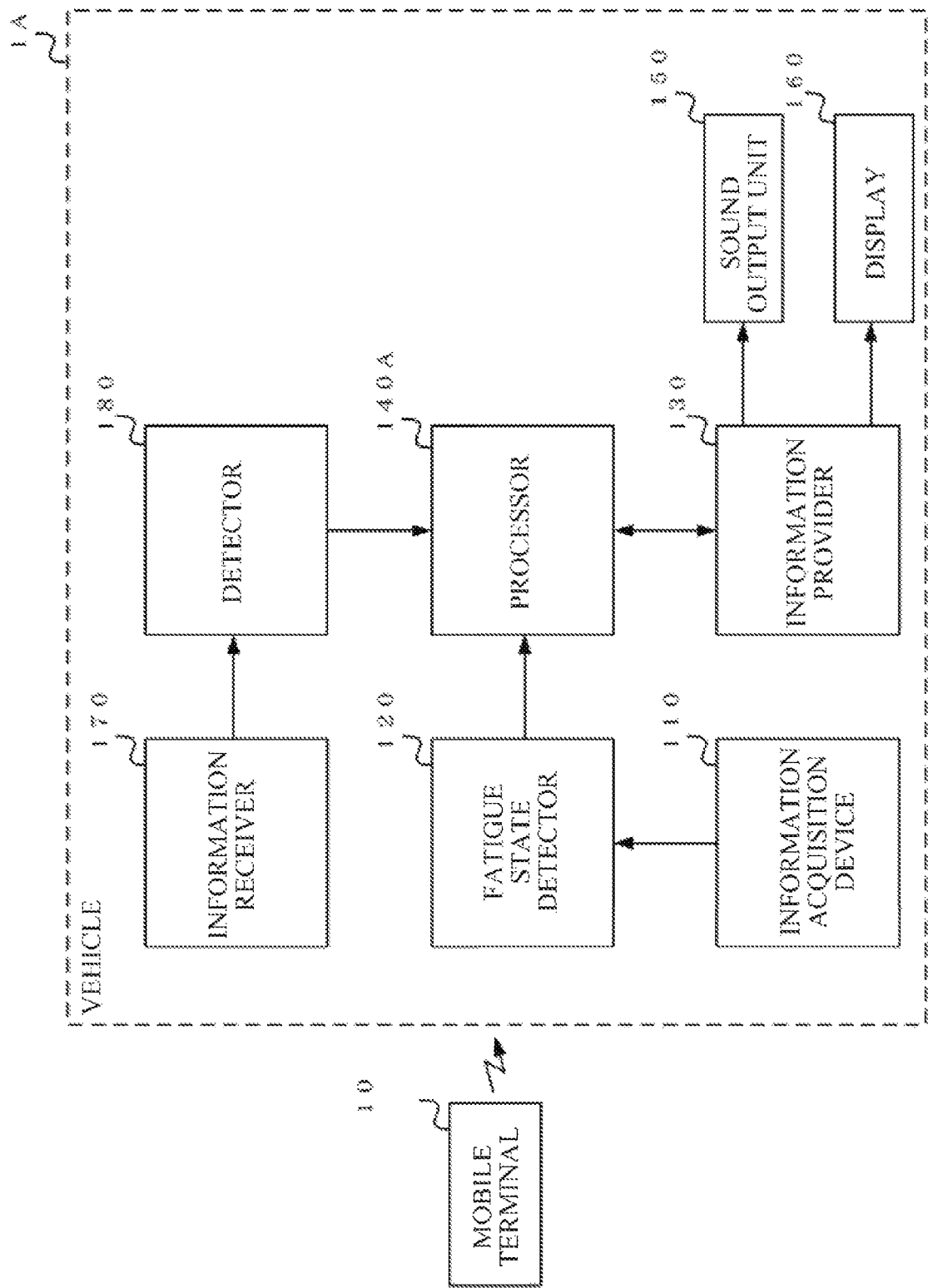
FIG. 4 is a diagram illustrating a configuration of a vehicle according to one example embodiment of the disclosure.
Figure 5:
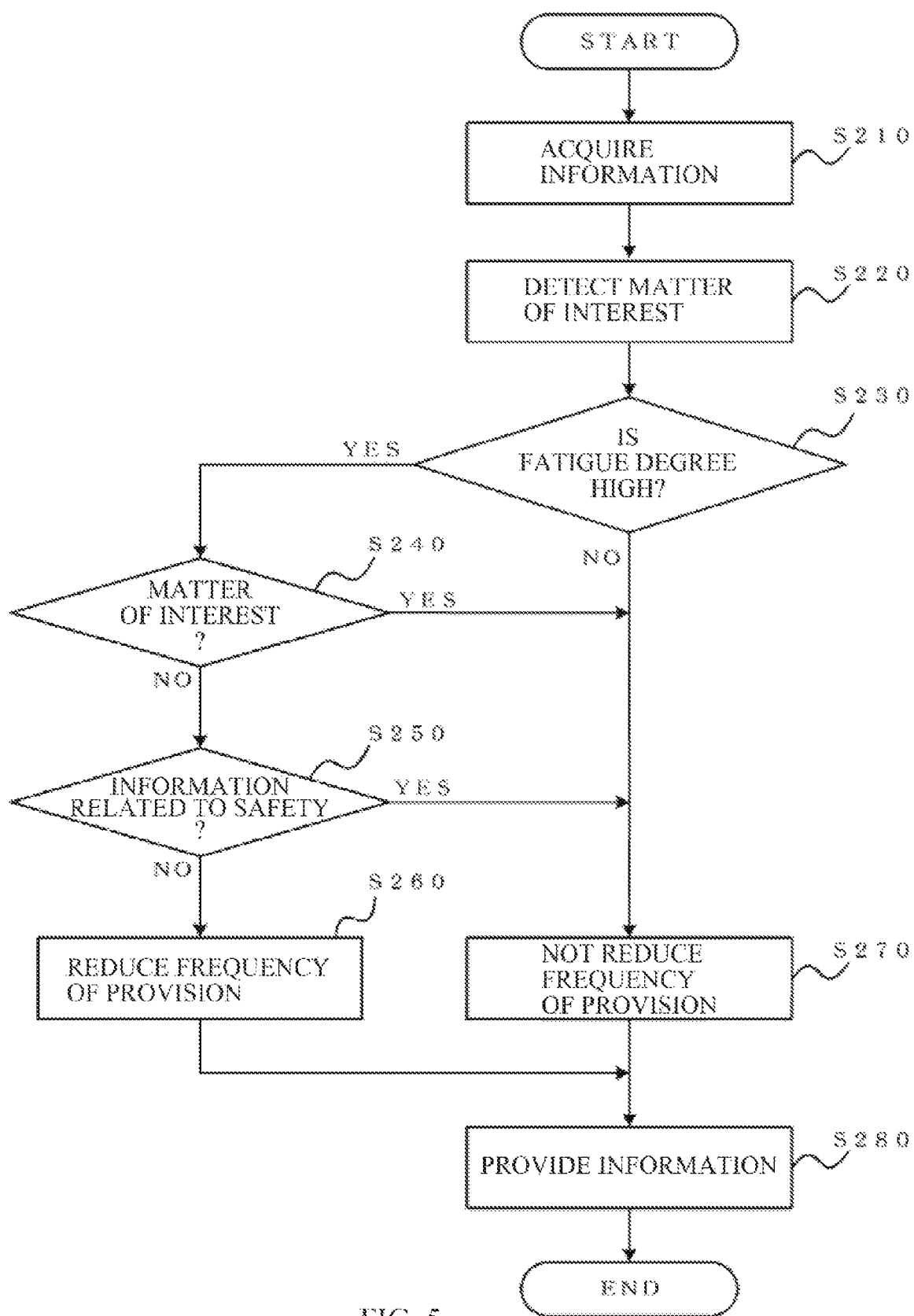
FIG. 5 is a diagram illustrating a processing flow of the vehicle according to one example embodiment of the disclosure.

As illustrated in FIG. 4, the vehicle 1A according to the example embodiment may include the information acquisition device 110, the fatigue state detector 120, the information provider 130, a processor 140A, the sound output unit 150, the display 160, an information receiver 170, and a detector 180.

The information receiver 170 may communicate with the mobile terminal 10, and acquire information on the occupant.

The information receiver 170 may perform, for example, Bluetooth communication with a smartphone carried by the occupant, acquire information to be used to detect a matter of interest to the occupant, and transmit the information to the detector 180 to be described later. The smartphone may be an example of the mobile terminal 10.

Examples of the information acquired from the smartphone by the information receiver 170 may include search keyword information, browsing history information, a browsing time of each browsed URL, SNS followed channel information, SNS post information, and photographs taken by the occupant.

The detector 180 may detect the matter of interest to the occupant, based on the information acquired by the information receiver 170.

In one example, the detector 180 may detect favorite brand, entertainer, sports, etc., as the matter of interest to the occupant, from the SNS followed channel information followed by the occupant.

In addition, the detector 180 may refer to, for example, a search keyword used for URL search, and the browsing time of the URL found based on the search keyword. When the browsing time is a predetermined time or more, the detector 180 may detect the search keyword as the matter of interest to the occupant.

In addition, the detector 180 may analyze, for example, a SNS post sentence or a photograph taken by the occupant, and detect the matter of interest to the occupant.

Note that a detection method is not limited to the detection method described above, as long as the detector 180 is able to detect the matter of interest to the occupant from the information collected by the information receiver 170.

When the fatigue degree of the occupant is high, the processor 140A may select information related to the matter of interest to the occupant detected by the detector 180, and change the frequency of providing information other than the selected information.

In one example, when the fatigue degree of the occupant is high, the processor 140A may determine whether the information to be provided to the occupant by the information provider 130 is information related to the matter of interest to the occupant. When the information is information related to the matter of interest to the occupant, the processor 140A may control the information provider 130 to provide the information to the occupant.

When the information to be provided to the occupant by the information provider 130 is not information related to the matter of interest to the occupant, the processor 140A may control the information provider 130 not to provide the information to the occupant, to make a change of reducing the frequency of information provision.

For example, the processor 140A may refer to a database holding related words strongly related to specific words, and acquire a related word strongly related to the search keyword detected by the detector 180. When the related word or the search keyword is included in the information to be provided to the occupant, the processor 140A may determine that the information is information related to the matter of interest to the occupant.

Note that a determination method is not limited to the determination method described above, as long as the processor 140A is able to determine whether the information to be provided and the matter of interest to the occupant are related to each other.

In addition, even when the fatigue degree of the occupant is high, the processor 140A may refrain from changing the frequency of providing information related to traveling safety, and change the frequency of providing information categorized in another category.

In other words, even when the fatigue degree of the occupant is high, when the information to be provided to the occupant by the information provider 130 is information related to traveling safety, the processor 140A may control the information provider 130 to provide the information to the occupant, without changing the frequency of provision.

Examples of the information related to traveling safety may include information on an accident-prone spot near a position of the own vehicle, information on a sharp curve involving a risk and present ahead of the own vehicle, alert information related to weather, traffic regulation information, traffic congestion information, and accident information.

When the information to be provided to the occupant by the information provider 130 is not information related to traveling safety, the processor 140A may perform control of reducing the frequency of information provision, for example, by the method of restricting the number of pieces of information to be provided per unit time.

Processing by Vehicle 1A

Processing by the vehicle 1A is described with reference to FIG. 5.

The fatigue state detector 120 may acquire, from the mobile terminal 10 or the information acquisition device 110, information to be used to detect the fatigue degree of the occupant (step S210), and cause the processing to proceed to step S220.

The detector 180 may detect the matter of interest to the occupant, based on information acquired by the information receiver 170 (step S220), and cause the processing to proceed to step S230.

The fatigue state detector 120 may determine whether the fatigue degree of the occupant is high, based on the information acquired in step S210 (step S230).

If the fatigue state detector 120 determines that the fatigue degree of the occupant is high ("YES" in step S230), the fatigue state detector 120 may cause the processing to proceed to step S240.

If the fatigue state detector 120 determines that the fatigue degree of the occupant is not high ("NO" in step S230), the fatigue state detector 120 may cause the processing to proceed to step S270.

If it is determined by the fatigue state detector 120 that the fatigue degree of the occupant is high ("YES" in step S230), the processor 140A may determine whether the information to be provided by the information provider 130 is information related to the matter of interest to the occupant (step S240).

If the processor 140A determines that the information to be provided by the information provider 130 is information related to the matter of interest to the occupant ("YES" in step S240), the processor 140A may cause the processing to proceed to step S270.

If the processor 140A determines that the information to be provided by the information provider 130 is not information related to the matter of interest to the occupant ("NO" in step S240), the processor 140A may cause the processing to proceed to step S250.

If the processor 140A determines that the information to be provided by the information provider 130 is not information related to the matter of interest to the occupant ("NO" in step S240), the processor 140A may determine whether the information to be provided by the information provider 130 is information related to traveling safety (step S250).

If the processor 140A determines that the information to be provided by the information provider 130 is information related to traveling safety ("YES" in step S250), the processor 140A may cause the processing to proceed to step S270.

If the processor 140A determines that the information to be provided by the information provider 130 is not information related to traveling safety ("NO" in step S250), the processor 140A may cause the processing to proceed to step S260.

If the processor 140A determines that information to be provided by the information provider 130 is not information related to traveling safety ("NO" in step S250), the processor 140A may perform control of reducing the frequency of providing information by the information provider 130 (step S260), and cause the processing to proceed to step S280.

The processor 140A may perform control of not reducing the frequency of providing information by the information provider 130 (step S270), and cause the processing to proceed to step S280.

The information provider 130 may provide information to the occupant, in accordance with the control by the processor 140A (step S280), and end the processing.

Workings and Effects

As described above, even when the fatigue degree of the occupant is high, the processor 140A of the vehicle 1A according to the example embodiment may select information related to the matter of interest to the occupant detected by the detector 180, and control the information provider 130 to provide the information to the occupant.

In other words, because information related to the matter of interest to the occupant is beneficial for the occupant, even in a state in which the fatigue degree of the occupant is high, the vehicle 1A may provide the information to the occupant without reducing the frequency of provision.

This enables the vehicle 1A to surely provide information beneficial for the occupant.

In addition, the frequency of providing information unrelated to the matter of interest to the occupant may be reduced in accordance with the fatigue degree of the occupant, which allows the occupant to perform driving without feeling uncomfortable.

Even when the fatigue degree of the occupant is high, the processor 140A of the vehicle 1A according to the example embodiment may refrain from changing the frequency of providing information related to safety of traveling, and change the frequency of providing information categorized in another category other than safety of traveling.

In other words, even when the fatigue degree of the occupant is high, when the information to be provided by the information provider 130 is information related to traveling safety, the processor 140A may control the information provider 130 to surely provide the information to the occupant.

Thus, even when the fatigue degree of the occupant is high, the vehicle 1A surely provides information related to traveling safety to the occupant, which makes it possible to prevent, for example, occurrence of an unexpected event such as an accident at a place such as an accident-prone spot or a sharp curve.

In addition, the frequency of providing information other than information related to traveling safety, i.e., information categorized in another category, may be reduced in accordance with the fatigue degree of the occupant, which allows the occupant to perform driving without feeling uncomfortable.

Modification Example 1

The fatigue state detector 120 described above may learn a relationship between an elapsed driving time of the occupant and information related to the fatigue degree of the occupant acquired from the information acquisition device 110, and detect the fatigue degree of the occupant based on the elapsed driving time.

Thus, the vehicle 1 is able to grasp the tendency of a change in the fatigue degree resulting from driving of each occupant, which makes it possible to provide information to each occupant at an appropriate frequency.

In some embodiments, it is possible to implement the vehicle 1 of the example embodiment of the disclosure by recording the process to be executed by components including the fatigue state detector 120, the processor 140, and the detector 180 on a non-transitory recording medium readable by a computer system, and causing the computer system to load the program recorded on the non-transitory recording medium onto the components including the fatigue state detector 120, the processor 140, and the detector 180 to execute the program.

The computer system as used herein may encompass an operating system (OS) and a hardware such as a peripheral device.

In addition, when the computer system utilizes a World Wide Web (WWW) system, the "computer system" may encompass a website providing environment (or a website displaying environment).

The program may be transmitted from a computer system that contains the program in a storage device or the like to another computer system via a transmission medium or by a carrier wave in a transmission medium.

The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

Each of the fatigue state detector 120, the information provider 130, the processors 140 and 140A, and the detector 180 illustrated in FIGS. 1 and 4 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the fatigue state detector 120, the information provider 130, the processors 140 and 140A, and the detector 180. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the fatigue state detector 120, the information provider 130, the processors 140 and 140A, and the detector 180 illustrated in FIGS. 1 and 4.

The invention claimed is:
1. A vehicle comprising:
an information receiver configured to communicate with a mobile terminal of an occupant of the vehicle, and acquire information on the occupant from the mobile terminal;
a fatigue state detector configured to detect, based on the information from the mobile terminal, a fatigue degree of the occupant of the vehicle;
an information provider configured to provide various pieces of information related to traveling of the vehicle to the occupant;

a processor configured to change a frequency of providing the various pieces of the information by the information provider, depending on the fatigue degree of the occupant; and a detector configured to detect a matter of interest to the occupant based on the information from the mobile terminal, wherein the processor is configured to, when the fatigue degree of the occupant is equal to or greater than a threshold, select information related to the matter of interest to the occupant detected by the detector, and change the frequency of providing information other than the selected information.

2. The vehicle according to claim 1, wherein the fatigue state detector is configured to detect the fatigue degree of the occupant before getting in the vehicle or during the traveling, based on the information from the mobile terminal of the occupant.

3. The vehicle according to claim 1, wherein the processor is configured to, even when the fatigue degree of the occupant is equal to or greater than a threshold, refrain from changing a frequency of providing information related to safety of the traveling, and change a frequency of providing information categorized in another category other than the safety of the traveling.

4. The vehicle according to claim 1,
wherein the information on the occupant from the mobile terminal includes biometric or activity data of the occupant, and
wherein the fatigue state detector is configured to detect the fatigue degree of the occupant based on the biometric or activity data of the occupant.

5. The vehicle according to claim 1, wherein the fatigue state detector is further configured to detect the fatigue degree of the occupant based on an elapsed driving time of the occupant in addition to the information on the occupant from the mobile terminal.

6. A vehicle comprising:
a fatigue state detector configured to detect a fatigue degree of an occupant of the vehicle;
an information provider configured to provide various pieces of information related to traveling of the vehicle to the occupant; and
a processor configured to change a frequency of providing the various pieces of the information by the information provider, when the fatigue degree of the occupant is equal to or greater than a threshold,
wherein the processor is further configured to, even when the fatigue degree of the occupant is equal to or greater than a threshold, refrain from changing a frequency of providing information related to safety of the traveling, and change a frequency of providing information categorized in another category other than the safety of the traveling.

7. The vehicle according to claim 6, further comprising an information receiver configured to communicate with a mobile terminal of the occupant, and acquire information on the occupant from the mobile terminal,
wherein the fatigue state detector is further configured to detect the fatigue degree of the occupant based the information on the occupant from the mobile terminal.

8. The vehicle according to claim 7,
wherein the information on the occupant from the mobile terminal includes biometric or activity data of the occupant, and
wherein the fatigue state detector is configured to detect the fatigue degree of the occupant based on the biometric or activity data of the occupant.

9. The vehicle according to claim 7, wherein the fatigue state detector is further configured to detect the fatigue degree of the occupant based on an elapsed driving time of the occupant in addition to the information on the occupant from the mobile terminal.

10. The vehicle according to claim 6, wherein the information related to safety of the traveling includes at least one of information on accident-prone spots, information on sharp curves present ahead of the vehicle, weather alerts, traffic regulation information, traffic congestion information, and accident information.

11. A vehicle comprising circuitry configured to:
communicate with a mobile terminal of an occupant of the vehicle, and acquire information on the occupant from the mobile terminal;
detect a fatigue degree of the occupant of the vehicle based on the information from the mobile terminal;
provide various pieces of information related to traveling of the vehicle to the occupant;
change a frequency of providing the various pieces of the information, depending on the fatigue degree of the occupant; and
detect a matter of interest to the occupant based on the information from the mobile terminal,
wherein the circuitry is further configured to, when the fatigue degree of the occupant is equal to or greater than a threshold, select information related to the detected matter of interest to the occupant, and change the frequency of providing information other than the selected information.

* * * * *